(12) United States Patent
Endo et al.

(10) Patent No.: US 9,343,113 B2
(45) Date of Patent: May 17, 2016

(54) CONTROL APPARATUS AND CONTROL METHOD

(71) Applicant: FUJITSU LIMITED, Kawasaki-shi, Kanagawa (JP)

(72) Inventors: Atsushi Endo, Kawasaki (JP); Mitsuteru Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/722,308

(22) Filed: May 27, 2015

(65) Prior Publication Data

US 2015/0364160 A1    Dec. 17, 2015

(30) Foreign Application Priority Data

Jun. 17, 2014  (JP) ................. 2014-124111

(51) Int. Cl.
| | | |
|---|---|---|
| *G11B 27/36* | (2006.01) | |
| *G11B 5/09* | (2006.01) | |
| *G06F 3/06* | (2006.01) | |

(52) U.S. Cl.
CPC .............. *G11B 27/36* (2013.01); *G06F 3/0619* (2013.01); *G06F 3/0653* (2013.01); *G06F 3/0689* (2013.01)

(58) Field of Classification Search
CPC .. G11B 27/329; G11B 27/36; G11B 2220/20; G11B 2220/90; G11B 27/327; G11B 15/62; G11B 19/12; G11B 5/012; G11B 27/3027
USPC ................... 360/31, 48, 130.33, 53; 369/53.2
See application file for complete search history.

(56) References Cited

U.S. PATENT DOCUMENTS

| | | | | |
|---|---|---|---|---|
| 5,406,425 A | * | 4/1995 | Johnston | G06F 3/0601 360/48 |
| 5,617,535 A | * | 4/1997 | Aizawa | G11B 15/026 360/31 |
| 5,748,589 A | * | 5/1998 | Shimizu | G11B 20/1816 369/53.2 |
| 5,894,376 A | * | 4/1999 | Rinard | G11B 15/686 360/130.23 |
| 6,970,310 B2 | * | 11/2005 | Kawaguchi | G11B 19/04 360/31 |
| 2010/0188767 A1 | | 7/2010 | Hirose et al. | |

FOREIGN PATENT DOCUMENTS

| | | |
|---|---|---|
| JP | 2001-35096 | 2/2001 |
| JP | 2003-228925 | 8/2003 |
| WO | 2009/040929 A1 | 4/2009 |

* cited by examiner

*Primary Examiner* — Nabil Hindi
(74) *Attorney, Agent, or Firm* — Staas & Halsey LLP

(57) ABSTRACT

A control apparatus includes a storage unit and a processor. The storage unit is configured to store diagnosis information regarding storage apparatuses to be diagnosed. The processor is configured to receive a write request from an information processing apparatus. The write request requests to write first data into a first logical area corresponding to a first physical area of a first storage apparatus. The processor is configured to determine, on basis of the diagnosis information, whether the first storage apparatus is one of the storage apparatuses to be diagnosed. The processor is configured to cause, when it is determined that the first storage apparatus is one of the storage apparatuses to be diagnosed, the first storage apparatus to execute a write-and-verify process including: writing the first data into the first physical area, and confirming whether the first data is normally read from the first physical area.

7 Claims, 10 Drawing Sheets

| AREA No | HEAD | CYLINDER | SECTOR | ADDRESS |
|---|---|---|---|---|
| 1 | 0 | 124 | 0 | 0x000122 |
| 2 | 1 | 16 | 0 | 0x001121 |
| 3 | 2 | 56 | 0 | 0x39833 |
| … | … | … | 0 | … |
| … | 1 | 11 | 0 | 0x5121 |
| m | 2 | 222 | 0 | 0x87878 |

| HDD No | AREA No |
|--------|---------|
| 1 | 28 |
| 2 | 7434 |
| … | … |
| n | 1942 |

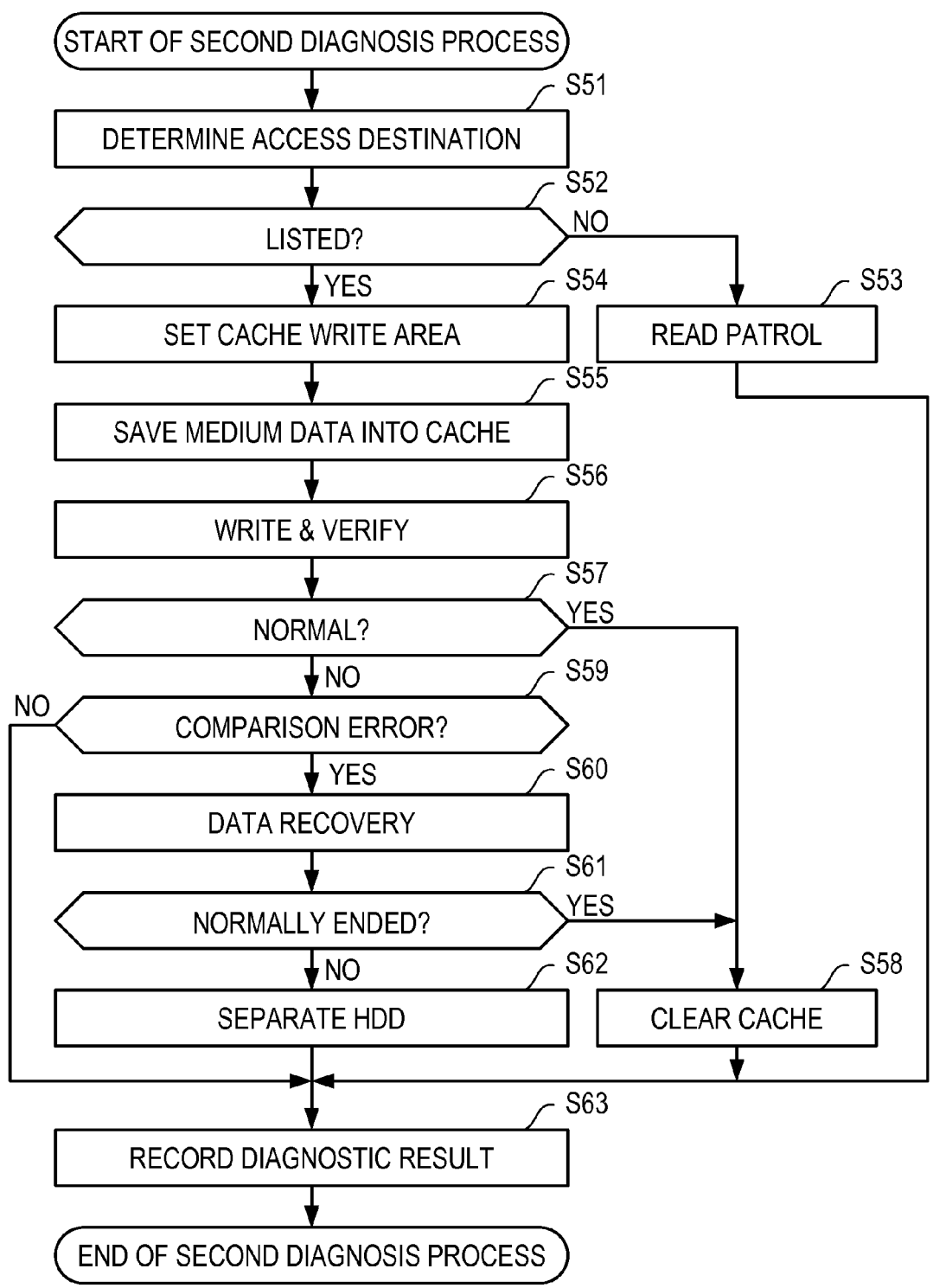

CONTROL APPARATUS AND CONTROL METHOD

CROSS-REFERENCE TO RELATED APPLICATION

This application is based upon and claims the benefit of priority from the prior Japanese Patent Application No. 2014-124111 filed on Jun. 17, 2014, the entire contents of which are incorporated herein by reference.

FIELD

The embodiments discussed herein are related to a control apparatus and a control method.

BACKGROUND

A data center is required to handle large amounts of data while securing reliability, so that a redundant array of inexpensive disks (RAID) scheme using a plurality of hard disk drives (HDDs) is generally employed.

Therefore, an HDD diagnoses a write head or a recording medium (disk) in order to secure the reliability of the HDD. For example, in the HDD, a write patrol is performed, in which a predetermined area of a disk is set as a diagnosis area and an operation of the write head is confirmed by writing an inspection data into the diagnosis area or reading the written inspection data from the diagnosis area.

Related techniques are disclosed in, for example, Japanese Laid-Open Patent Publication No. 2001-35096, Japanese Laid-Open Patent Publication No. 2003-228925, and International Publication Pamphlet No. WO 2009/040929.

As a storage capacity of an HDD (a storage apparatus) is further increased, the diagnosis area becomes relatively smaller compared to a user area and thus the head may reside in a fixed point floating state. Even though the HDD may avoid the fixed point floating state of the head by expanding the diagnosis area, the expansion may cause another problem that an area which may not be used as the user area is increased.

Further, when a timing of input/output (I/O) request and a timing of diagnosis are coincident with each other, the diagnosis operation of the HDD affects the I/O performance.

SUMMARY

According to an aspect of the present invention, provided is a control apparatus including a storage unit and a processor. The storage unit is configured to store diagnosis information regarding storage apparatuses to be diagnosed. The processor is configured to receive a write request from an information processing apparatus. The write request requests to write first data into a first logical area corresponding to a first physical area of a first storage apparatus. The processor is configured to determine, on basis of the diagnosis information, whether the first storage apparatus is one of the storage apparatuses to be diagnosed. The processor is configured to cause, when it is determined that the first storage apparatus is one of the storage apparatuses to be diagnosed, the first storage apparatus to execute a write-and-verify process including: writing the first data into the first physical area, and confirming whether the first data is normally read from the first physical area.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of an access destination area list according to the second embodiment;

FIG. 6 is a diagram illustrating an example of an access destination check list according to the second embodiment;

FIG. 10 is a flowchart illustrating a second diagnosis process according to the second embodiment.

DESCRIPTION OF EMBODIMENTS

Hereinafter, descriptions will be made on embodiments in detail with reference to accompanying drawings.

First Embodiment

Figure 1:
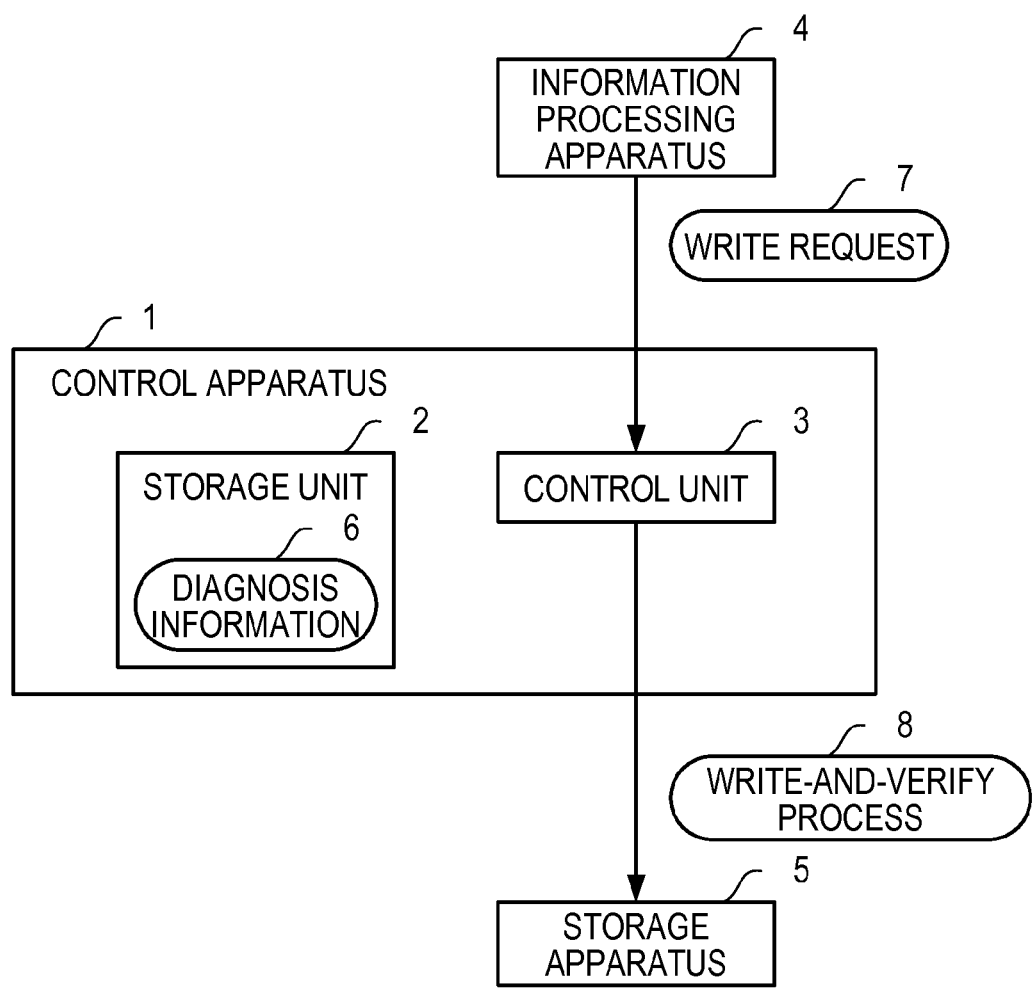
FIG. 1 is a diagram illustrating an exemplary configuration of a control apparatus according to a first embodiment.

First, a first embodiment will be described with reference to FIG. 1. FIG. 1 is a diagram illustrating an exemplary configuration of a control apparatus according to the first embodiment.

A control apparatus 1 controls a storage apparatus 5, that is, the storage apparatus 5 is a controlling target (an apparatus to be controlled) of the control apparatus 1. The control apparatus 1 receives a write request 7 from an information processing apparatus 4 and writes data corresponding to the write request 7 into the storage apparatus 5. The information processing apparatus 4 is communicably connected to the control apparatus 1 and issues a command (I/O request such as a write request or a read request, for example) to the control apparatus 1. The information processing apparatus 4 is, for example, a host or a server that corresponds to an upper level apparatus with respect to the control apparatus 1.

Data corresponding to a write request 7 issued by the information processing apparatus 4 may be written into the storage apparatus 5 and data corresponding to a read request issued by the information processing apparatus 4 may be read from the storage apparatus 5. The storage apparatus 5 is a controlling target as well as a diagnosing target (an apparatus to be diagnosed) of the control apparatus 1, that is, the control apparatus 1 diagnoses the storage apparatus 5. The storage apparatus 5 is, for example, one or more HDDs.

The control apparatus 1 includes a storage unit 2 and a control unit 3. The storage unit 2 stores therein diagnosis information 6. The diagnosis information 6 is information about a diagnosis of the storage apparatus 5. The diagnosis of the storage apparatus 5 is to confirm a state of the storage apparatus 5. For example, the diagnosis of the storage apparatus 5 includes confirming whether data may be normally written into the storage apparatus 5, whether data may be normally read from the storage apparatus 5, and whether the storage apparatus 5 normally maintains data.

The control unit 3 may receive various requests from the information processing apparatus 4 to output commands corresponding to the requests. Further, based on the diagnosis information 6, the control unit 3 determines whether the storage apparatus 5, which is a writing target (an apparatus to which data is written) of write data corresponding to the write request 7 received from the information processing apparatus 4, is a diagnosing target.

When the storage apparatus 5 is not a diagnosing target, the control unit 3 issues a write command corresponding to the write request 7 to cause the storage apparatus 5 to execute writing of data. When the storage apparatus 5 is a diagnosing target, the control unit 3 issues a write-and-verify command instead of the write command corresponding to the write request 7. The write-and-verify command causes the storage apparatus 5 to execute a "writing and verifying" (a write-and-verify process 8) instead of simply writing the write data at the write position designated by the write command corresponding to the write request 7. The write-and-verify process 8 includes two processes, that is, a write process of writing data and a verify-read (confirmation) process of confirming whether the data is correctly read.

As described above, since the control apparatus 1 performs a diagnosis using the write request 7 issued by the information processing apparatus 4, the control apparatus 1 may use a user area of the storage apparatus 5 as a diagnosis area. Accordingly, the control apparatus 1 does not need to prepare a diagnosis area in the storage apparatus 5 other than the user area. Therefore, the control apparatus 1 may expand the diagnosing target area of the storage apparatus 5 to the user area without expanding the diagnosis area. Thus, an effective use of the storage area may be achieved in the storage apparatus 5 described above.

Further, since the control apparatus 1 performs the diagnosis using the write request 7 issued by the information processing apparatus 4, the control apparatus 1 may suppress an influence on an I/O performance caused by coincidence of a timing of a diagnosis process and an issuance timing of the write command corresponding to the write request 7.

Accordingly, the control apparatus 1 may perform diagnosis of the storage apparatus 5 without limiting the user area while suppressing the reduction of I/O performance.

Second Embodiment

Figure 2:
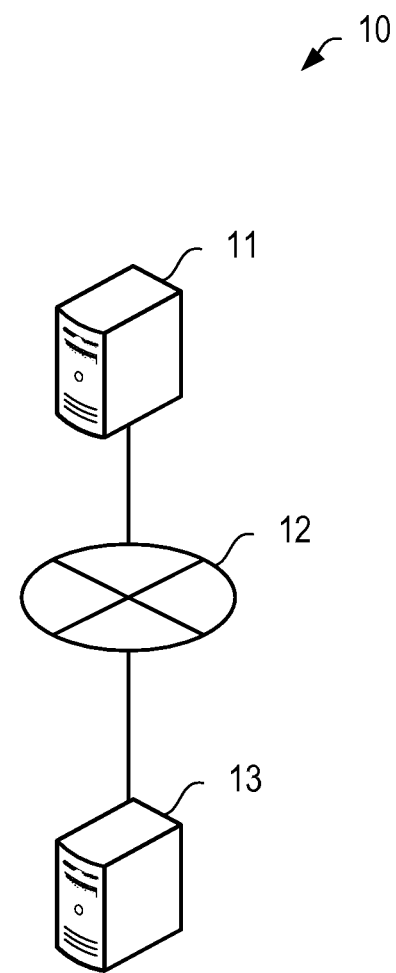
FIG. 2 is a diagram illustrating an exemplary configuration of a storage system according to a second embodiment.

Next, a storage system according to a second embodiment will be described with reference to FIG. 2. FIG. 2 is a diagram illustrating an exemplary configuration of a storage system according to the second embodiment.

A storage system 10 includes a host 11 and a RAID apparatus 13 connected to the host 11 through a network 12. The storage system 10 writes data into the RAID apparatus 13 or reads data from the RAID apparatus 13 in response to an I/O request issued by the host 11.

Figure 3:
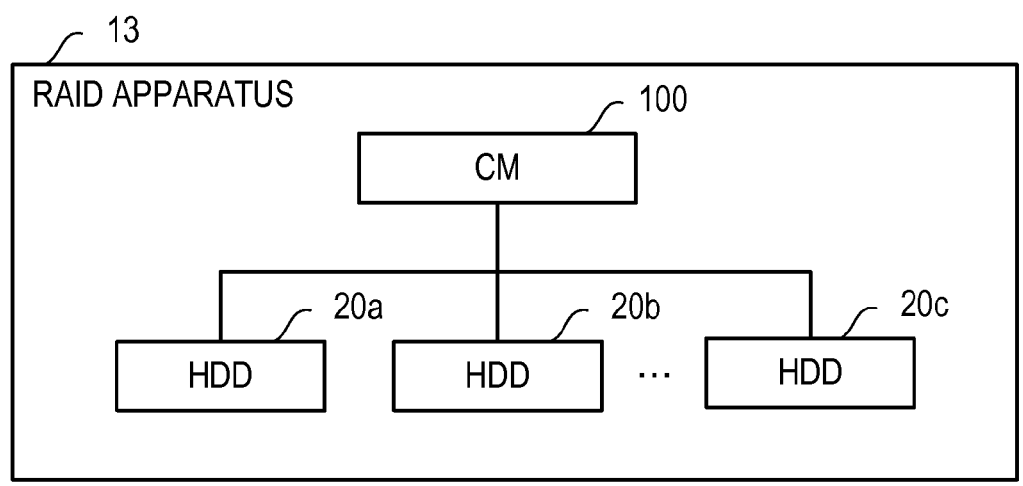
FIG. 3 is a diagram illustrating an exemplary configuration of a RAID apparatus according to the second embodiment.

Next, a configuration of the RAID apparatus 13 according to the second embodiment will be described with reference to FIG. 3. FIG. 3 is a diagram illustrating an exemplary configuration of a RAID apparatus according to the second embodiment. The RAID apparatus 13 includes a CM 100 and a plurality of HDDs 20 (20a, 20b, ..., 20c). The RAID apparatus 13 is equipped with a RAID using the plurality of HDDs 20. The CM 100 is a controller module of the RAID apparatus 13, and receives a host I/O (I/O request issued by the host 11) from the host 11 to control the HDDs 20. Accordingly, the RAID apparatus 13 (CM 100) corresponds to a control apparatus controls the HDDs 20.

Figure 4:
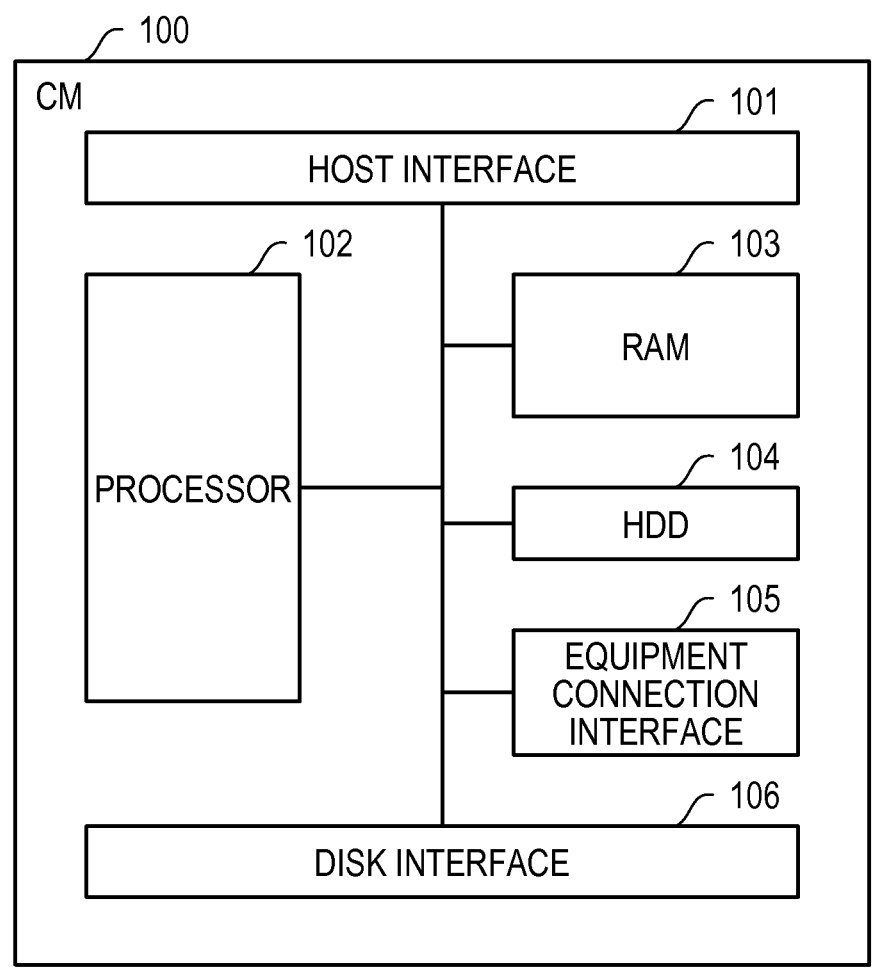
FIG. 4 is a diagram illustrating an exemplary hardware configuration of a CM according to the second embodiment.

The RAID apparatus 13 may be provided with built-in HDDs 20 or externally connected HDDs 20. Next, a hardware configuration of the CM 100 according to the second embodiment will be described with reference to FIG. 4. FIG. 4 is a diagram illustrating an exemplary hardware configuration of a CM according to the second embodiment.

The CM 100 includes a host interface 101, a processor 102, a random access memory (RAM) 103, an HDD 104, an equipment connection interface 105, and a disk interface 106.

The CM 100 is controlled by the processor 102 in its entirety. The RAM 103 and a plurality of peripheral equipments are connected to the processor 102 through a bus. The processor 102 may be a multi-core processor composed of two or more processors.

The processor 102 is, for example, a central processing unit (CPU), a micro processing unit (MPU), a digital signal processor (DSP), an application specific integrated circuit (ASIC), or a programmable logic device (PLD).

The RAM 103 is used as a primary storage apparatus of the CM 100. In the RAM 103, at least a portion of an operating system (OS) program or an application program to be executed by the processor 102 is temporarily stored. Further, various data used in a process to be executed by the processor 102 are stored in the RAM 103. The RAM 103 also functions as a cache memory of the processor 102.

The peripheral equipments connected to the bus may include the host interface 101, the HDD 104, the equipment connection interface 105, and the disk interface 106. The host interface 101 transmits and receives data to and from the host 11 through the network 12.

The HDD 104 magnetically writes and reads data into and from a built-in disk. The HDD 104 is used as an auxiliary storage apparatus of the CM 100. The OS program, the application program, and various data are stored in the HDD 104. A semiconductor storage apparatus such as a flash memory may be used as the auxiliary storage apparatus.

The equipment connection interface 105 is a communication interface for connecting peripheral equipment to the CM 100. For example, a memory apparatus or a memory reader/writer (not illustrated) may be connected to the equipment connection interface 105. The memory apparatus is a recording medium equipped with a function for communicating with the equipment connection interface 105. The memory reader/writer is an apparatus which writes or reads data into or from a memory card data. The memory card is, for example, a card type recording medium.

The equipment connection interface 105 may be connected with a monitor (not illustrated). In this case, the equipment connection interface 105 has a graphic processing function for displaying an image on a screen of the monitor in accordance with an instruction received from the processor 102.

The equipment connection interface 105 may be connected with a keyboard or a mouse (not illustrated). In this case, the equipment connection interface 105 transmits signals sent from the keyboard or the mouse to the processor 102. The mouse is an example of a pointing device, and other pointing device may be used. The other pointing device may include, for example, a touch panel, a tablet, a touch pad, and a track ball.

The equipment connection interface 105 may be connected with an optical drive apparatus (not illustrated). The optical drive apparatus reads data written into an optical disk by using, for example, laser light. The optical disk is a portable recording medium in which data is written to be capable of being read by reflection of light. The optical disk may include, for example, a digital versatile disc (DVD), a DVD-RAM, a compact disc read-only memory (CD-ROM), or a CD recordable/rewritable (CD-R/RW).

The disk interface 106 transmits and receives data to and from one or more HDDs 20. With the hardware configuration described above, the processing function of the CM 100 according to the second embodiment may be implemented. The host 11 and the control apparatus 1 described in the first embodiment may also be implemented by hardware similar to that of the CM 100 illustrated in FIG. 4.

For example, the CM 100 executes a program recorded in a computer-readable recording medium to implement the processing function according to the second embodiment. The program in which processing contents to be executed by the CM 100 are described may be recorded into various recording media. For example, the program to be executed by the CM 100 may be stored in the HDD 104. The processor 102 loads at least a portion of the program stored in the HDD 104 onto the RAM 103 and executes the program. The program to be executed by the CM 100 may be recorded in the portable recording medium such as the optical disk, the memory apparatus, or the memory card. The program stored in the portable recording medium becomes executable after being installed on the HDD 104 by, for example, a control from the processor 102. The processor 102 may directly read the program from the portable recording medium to be executed.

Next, an access destination area list will be described with reference to FIG. 5. The CM 100 stores an access destination area list for each HDD 20 which is controlled by the CM 100, in the RAM 103. The access destination area list is one of information corresponding to the diagnosis information 6 according to the first embodiment. FIG. 5 is a diagram illustrating an example of an access destination area list according to the second embodiment.

An access destination area list 500 includes items for "area No", "head", "cylinder", "sector", and "address". The item "area No" is identification information capable of identifying an area used for the diagnosis of the HDD 20. The item "area No" makes it possible to identify a specific storage area using the item "head", the item "cylinder", the item "sector", and the item "address" that are associated with the item "area No". The storage area identified by the item "area No" is a diagnosis area which is set according to characteristics of the HDD 20, and the access destination area list 500 is a list of the diagnosis areas identified by the items "area No". That is, the diagnosis area list is area identifying information capable of identifying the diagnosis area.

The diagnosis area is a storage area used for a diagnosis (second diagnosis process described later) performed when the host I/O is absent. The item "head" is information capable of identifying a head provided in the HDD 20. The head corresponds one-to-one with a disk surface and thus, in other words, the item "head" is information capable of identifying the disk surface on which data is stored and is one of the information used for identifying the storage area.

The item "cylinder" is information capable of identifying a track having the same radius on each disk surface and thus, in other words, the item "cylinder" is one of the information used for identifying the storage area. The item "sector" is information capable of identifying a sector which is an area formed by dividing the track and thus, in other words, the item "sector" is one of the information used for identifying the storage area.

The item "address" is identification information capable of uniquely identifying the sector, which is, for example, a logical sector, more specifically, a logical block addressing (LBA). The CM 100 designates an address of data with an LBA in the I/O request issued from the host 11 and the HDD 20 identifies a storage location of the data by a cylinder-header-sector (CHS) parameter corresponding to the LBA.

For example, the access destination area list 500 corresponds to the HDD 20a and includes an area No "1", area No "2", area No "3", . . . , area No "m". That is, m (10000, for example) diagnosis areas spanning from the area No "1" to the area No "m" are set in the HDD 20a. The area No "1" corresponds to an address "0x000122" which is a logical address and a physical address is identified by head "0", cylinder "124", and sector "0".

When an HDD 20 is installed in the RAID apparatus 13, the CM 100 acquires the access destination area list from the HDD 20 and stores the access destination area list in the RAM 103. Here, descriptions will be made on the access destination area list maintained in advance by the HDD 20. The access destination area list contains the diagnosis areas that are selected according to the characteristics of the HDD 20 in a manufacturing process of the HDD 20 and is stored in a memory equipped in the HDD 20. For example, the access destination area list is generated by the following access destination area list preparation process.

The access destination area list preparation process is, for example, a process executed by a control unit of a test apparatus for mass production of the HDD 20. The control unit of the test apparatus for mass production acquires information about the number of heads equipped in the HDD 20. The control unit of the test apparatus for mass production acquires information about the head, cylinder, and sector of the minimum address of the HDD 20. Further, the control unit of the test apparatus for mass production acquires information about the head, cylinder, and sector of the maximum address of the HDD 20.

The control unit of the test apparatus for mass production equally divides an area into subareas on the basis of a cylinder value of the maximum address. For example, the control unit equally divides the area into ten subareas. The control unit of the test apparatus for mass production acquires, in an order of address, addresses corresponding to sectors "0" of cylinders each selected randomly from the respective subareas formed by dividing the area. The control unit of the test apparatus for mass production registers the acquired addresses in the access destination area list.

The control unit of the test apparatus for mass production acquires the address information from each disk surface while changing a head for which the address information acquisition is performed. In this manner, the control unit of the test apparatus for mass production selects diagnosis areas from the entire area of the HDD 20 and generates the access destination area list.

The CM 100 may acquire the information to generate the access destination area list instead of the control unit of the test apparatus for mass production. Even though the access destination area list is prepared for each HDD 20 controlled by the CM 100 in the description described above, an item "HDD" capable of identifying the HDD 20 may be contained in the access destination area list in order for the CM 100 to maintain a single access destination area list.

Figure 6:
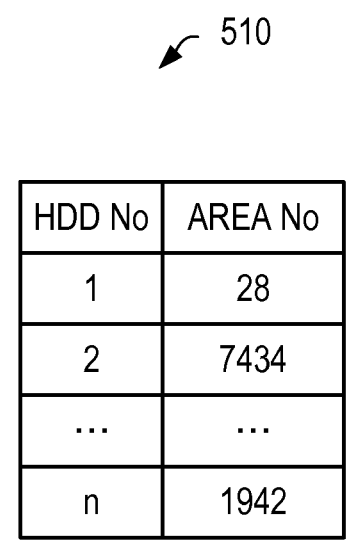

Next, an access destination check list will be described with reference to FIG. 6. The CM 100 stores a progress state of diagnosis for each HDD 20 controlled by the CM 100, in the RAM 103 as the access destination check list. The access destination check list is one of the information corresponding to the diagnosis information 6 according to the first embodiment. FIG. 6 is a diagram illustrating an example of an access destination check list according to the second embodiment.

An access destination check list 510 includes an item "HDD No" and an item "area No". The item "HDD No" is identification information capable of identifying the HDD 20. The item "area No" is identification information capable of identifying an area used for the diagnosis of the HDD 20. The item "HDD No" and the item "area No" indicate that the diagnosis area identified by the item "area No" is the next diagnosing target with respect to the HDD 20 identified by the item "HDD No".

For example, the access destination check list 510 indicates that the diagnosis area to be diagnosed next in the HDD 20 corresponding to the HDD No of "1" has an area No of "28" and the diagnosis area to be diagnosed next in the HDD 20 corresponding to the HDD No of "2" has an area No of "7434". As described above, the access destination check list 510 maintains the diagnosis area to be diagnosed next in the respective n HDDs 20 spanning from the HDD No of "1" to the HDD No of "n".

Figure 7:
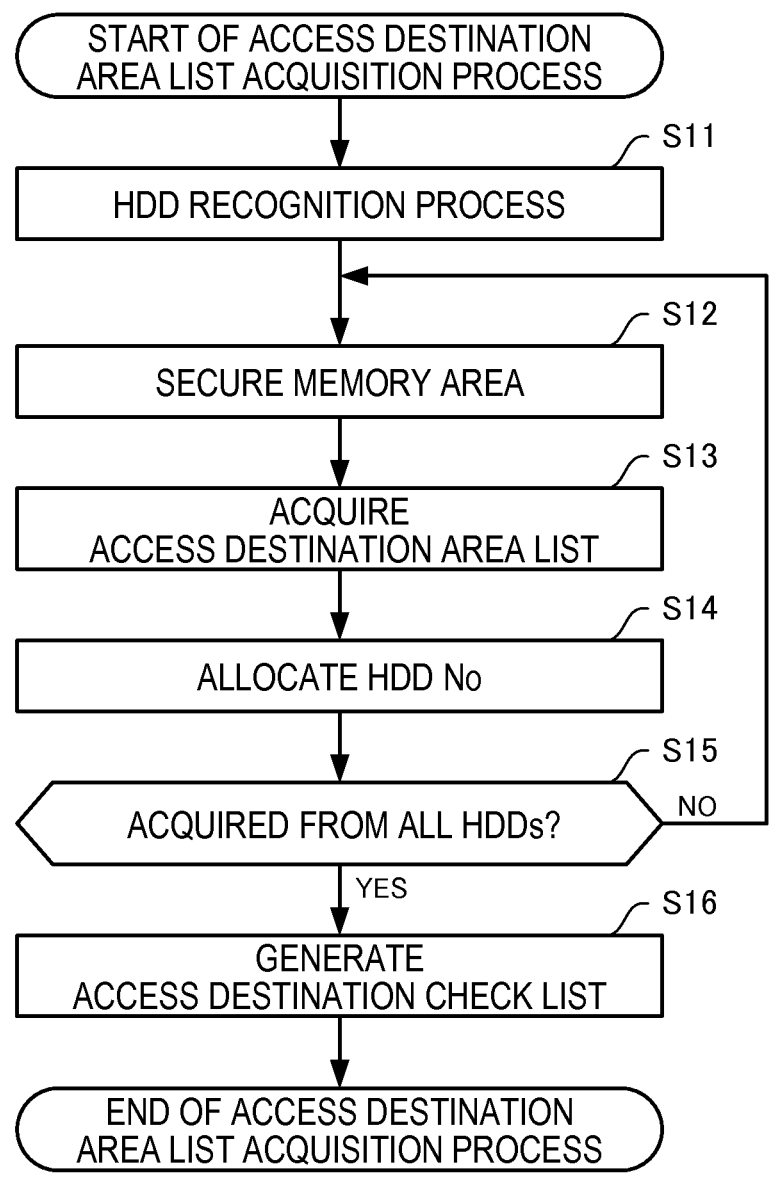
FIG. 7 is a flowchart illustrating an access destination area list acquisition process according to the second embodiment.

Next, an access destination area list acquisition process according to the second embodiment will be described with reference to FIG. 7. FIG. 7 is a flowchart illustrating an access destination area list acquisition process according to the second embodiment.

The access destination area list acquisition process is a process of acquiring the access destination area list from the HDD 20 to generate the access destination check list. The CM 100 executes the access destination area list acquisition process upon detecting installation of the HDD 20 on the RAID apparatus 13.

The CM 100 executes a process of recognizing an HDD 20 and detects an HDD 20 to be controlled (S11). The CM 100 secures, in the RAM 103, a memory area to be used for the diagnosis of the HDD 20 detected as a controlling target (S12).

The CM 100 acquires an access destination area list from the HDD 20 detected as the controlling target (S13). The CM 100 stores the acquired access destination area list in the RAM 103.

The CM 100 allocates an HDD No to the HDD 20 detected as the controlling target (S14). The CM 100 determines whether the access destination area list is acquired from all the HDDs 20 detected as the controlling target (S15). When it is determined that the access destination area list is acquired from all the HDDs 20 detected as the controlling target, the process to be performed by the CM 100 proceeds to S16. When it is determined that the access destination area list is not acquired from all the HDDs 20 detected as the controlling target, the process to be performed by the CM 100 proceeds to S12.

The CM 100 generates an access destination check list on the basis of the access destination area lists acquired from the HDDs 20 (S16). The CM 100 stores the generated access destination check list in the RAM 103 and ends the access destination area list acquisition process.

Figure 8:
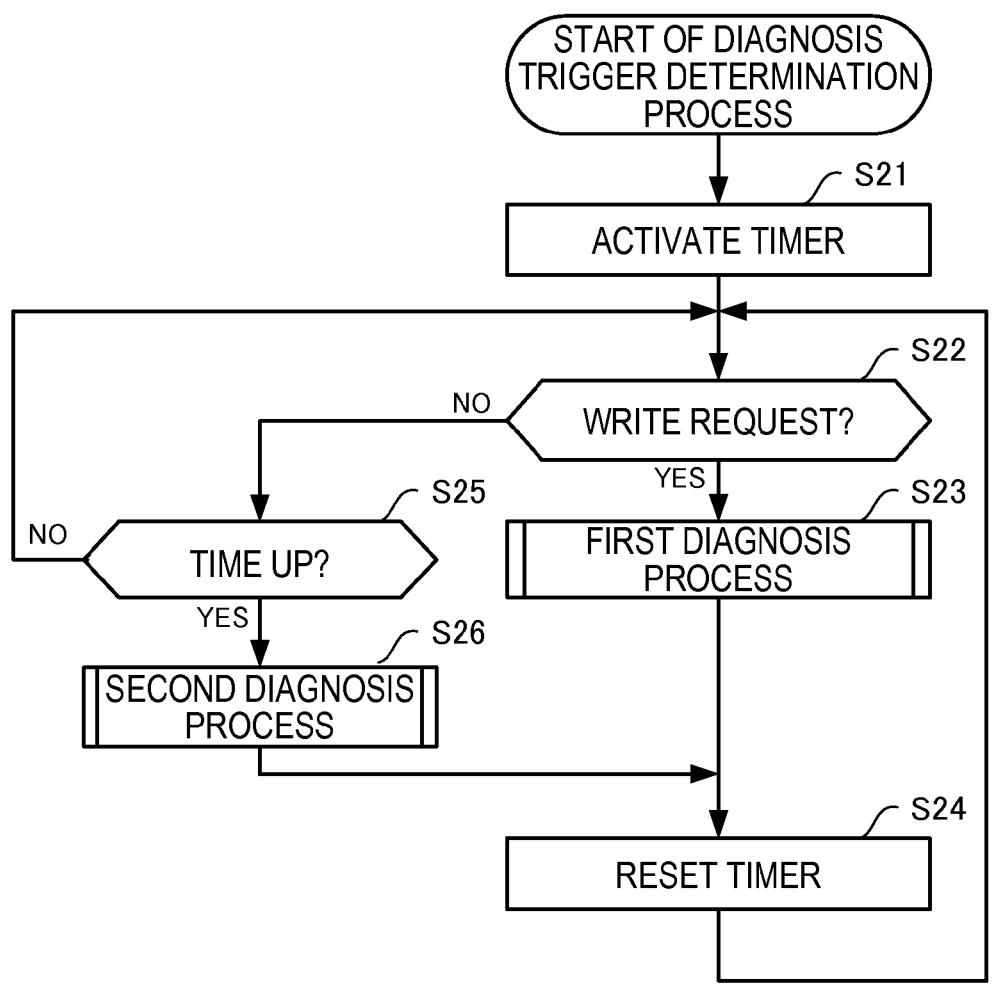
FIG. 8 is a flowchart illustrating a diagnosis trigger determination process according to the second embodiment.

The access destination area list acquisition process may be executed upon the activation of the RAID apparatus 13 and otherwise, may be executed as needed. Next, a diagnosis trigger determination process according to the second embodiment will be described with reference to FIG. 8. FIG. 8 is a flowchart illustrating a diagnosis trigger determination process according to the second embodiment.

The diagnosis trigger determination process is a process of determining an execution trigger of a diagnosis process which includes a first diagnosis process and a second diagnosis process. The diagnosis trigger determination process is a process executed by the CM 100 after the access destination area list acquisition process is executed.

The CM 100 activates a timer used for determining whether a write request is received from the host 11 within a predetermined time (S21). For example, the timer may be set to 5 (five) seconds, but settings of the timer may be changed depending on an environment of the RAID apparatus 13 and may be varied depending on load of the RAID apparatus 13 or the HDD 20.

The CM 100 determines whether a write request is received or not (S22). When it is determined that a write request is received, the process to be performed by the CM 100 proceeds to S23. When it is determined that a write request is not received, the process to be performed by the CM 100 proceeds to S26.

The CM 100 executes the first diagnosis process (S23). The first diagnosis process is a diagnosis process for the HDD 20 performed when a write request is received. Details of the first diagnosis process will be described with reference to FIG. 9 later.

The CM 100 resets the timer (S24) and the process to be performed by the CM 100 proceeds to S22. When the first diagnosis process has been executed, the CM 100 sets a time-up time to a first time (5 seconds, for example). When the second diagnosis process has been executed, the CM 100 sets a time-up time to a second time (500 milliseconds, for example). Accordingly, the CM 100 may execute more second diagnosis processes when a write request is not received and thus, abnormality of the head may be rapidly detected.

The CM 100 monitors time-up of the timer (S25). When it is determined that the time-up time of the timer expires, the process to be performed by the CM 100 proceeds to S26. When it is determined that the time-up time of the timer is not expired, the process to be performed by the CM 100 proceeds to S22 and waits until a write request is received.

The CM 100 executes the second diagnosis process (S26). The second diagnosis process is a diagnosis process for the HDD 20 performed when a write request is not received. Details of the second diagnosis process will be described with reference to FIG. 10 later. The process to be performed by the CM 100 proceeds to S24 after the second diagnosis process is executed.

As described above, when a write request is received from the host 11 within a timer monitoring time, the CM 100 executes the first diagnosis process. When a write request is not received from the host 11 within the timer monitoring time, the CM 100 executes the second diagnosis process.

Figure 9:
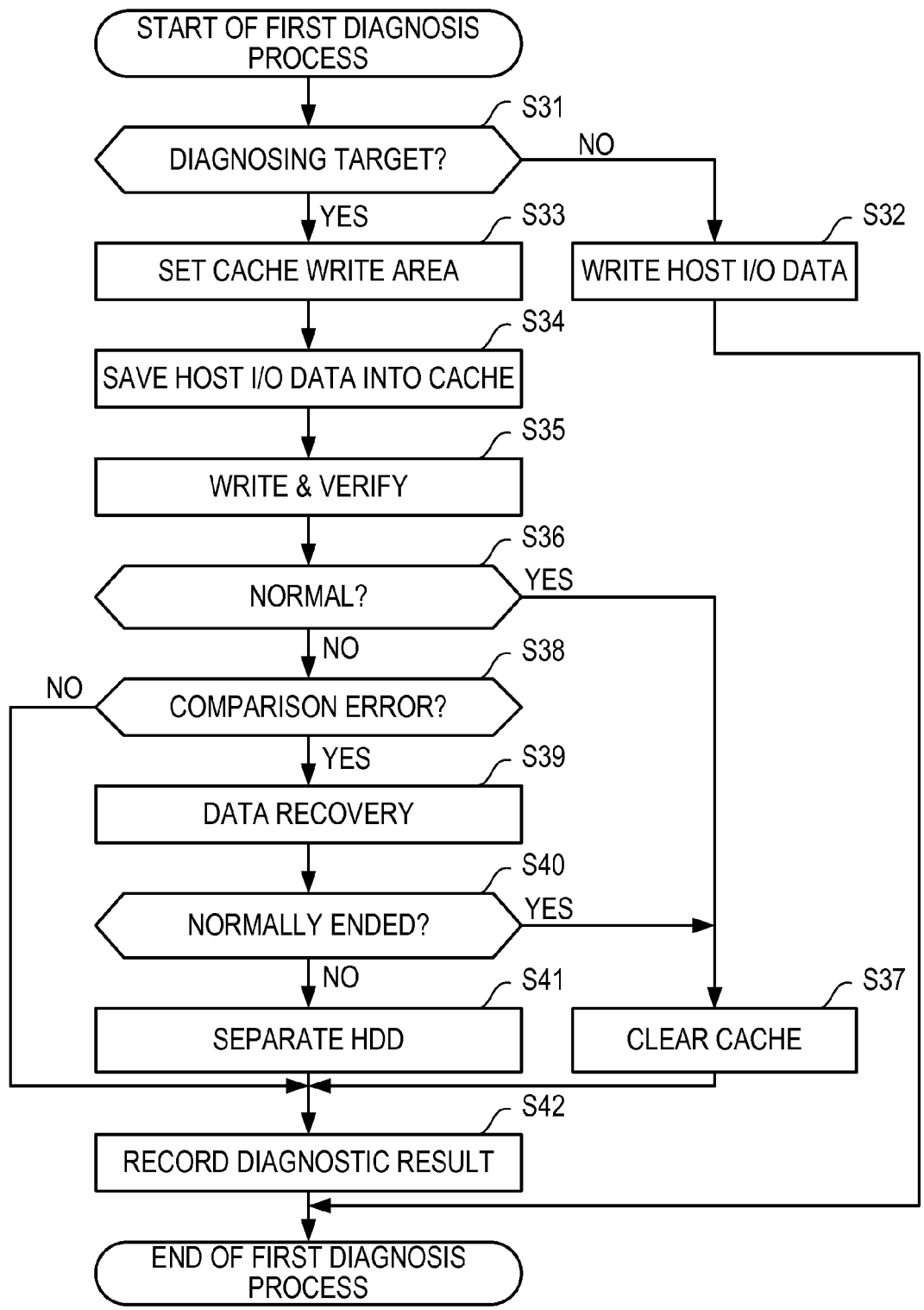
FIG. 9 is a flowchart illustrating a first diagnosis process according to the second embodiment.

Next, the first diagnosis process according to the second embodiment will be described with reference to FIG. 9. FIG. 9 is a flowchart illustrating the first diagnosis process according to the second embodiment. The first diagnosis process is a diagnosis process for the HDD 20 performed when a write request is received. The first diagnosis process is a process executed by CM 100 at S23 of the diagnosis trigger determination process.

The CM 100 selects the HDD 20 which is the diagnosing target from a RAID group which is a write requesting target (S31). The CM 100 executes S32 for the HDD 20 which is not a diagnosing target and S33 for the HDD 20 which is a diagnosing target among the RAID group which is the write requesting target.

The CM 100 rotationally selects, as a diagnosing target, a single HDD 20 at a time for the HDDs 20 constituting the RAID group. The CM 100 may select the HDD 20 using a method other than a rotational selection method as long as equal opportunity of diagnosis may be achieved for the HDDs 20 constituting the RAID group. Further, the CM 100 may select two or more HDDs 20 among the RAID group which is the write requesting target. In this case, two or more HDDs 20 redundantly storing the same data may be treated as the diagnosing targets for a single write request.

The CM 100 writes host I/O data (which includes target data of write requesting and parity data) in the HDD 20 which is not the diagnosing target (S32). The CM 100 writes the host I/O data with a write back in which the host I/O data is temporarily written in a cache memory. In this case, the CM 100 writes the host I/O data into an area for write back among the storage area of the cache memory.

The CM 100 sets, in the storage area of the cache memory, a cache write area for storing the host I/O data as data for diagnosis (S33). The CM 100 saves the host I/O data in the cache write area (S34). Upon saving the host I/O data in the cache write area, the CM 100 may send a completion reply of the host I/O to the host 11. Accordingly, the RAID apparatus 13 may rapidly send the completion reply of the host I/O to the host 11.

The CM 100 causes the HDD 20 to execute the write-and-verify in the storage area corresponding to the host I/O using the host I/O data stored in the cache write area (S35). Accordingly, the CM 100 may write the host I/O data in the storage area corresponding to the host I/O. As described above, the write-and-verify executed with respect to the HDD 20 may serve as the diagnosis of the HDD 20 selected as the diagnosing target and writing of data in response to the host I/O. The write-and-verify functions as a write patrol, that is, diagnosis of the head.

The CM 100 determines whether a result of the diagnosis by the write-and-verify is normal (S36). When it is determined that the result of the diagnosis by the write-and-verify is normal, the process to be performed by the CM 100 proceeds to S37. When it is determined that the result of the diagnosis by the write-and-verify is not normal, the process to be performed by the CM 100 proceeds to S38.

The CM 100 clears the host I/O data stored in the cache write area (S37). The CM 100 determines whether the diagnostic result which is not normal is a comparison error (S38). When it is determined that the diagnostic result is a comparison error, the process to be performed by the CM 100 proceeds to S39. When it is determined that the diagnostic result is not a comparison error, the process to be performed by the CM 100 proceeds to S42. The comparison error is an error that inconsistency between written data and read data in the write-and-verify is detected when comparing the written data with the read data.

The CM 100 performs a data recovery (S39). For example, the CM 100 performs a retry using the host I/O data stored in the cache write area or a reconstruction of data using the data of the RAID group and the parity data.

The CM 100 determines whether the data recovery is normally ended (S40). When it is determined that the data recovery is normally ended, the process to be performed by the CM 100 proceeds to S37. When it is determined that the data recovery is not normally ended, the process to be performed by the CM 100 proceeds to S41.

The CM 100 performs separation of the diagnosing target HDD (S41). For example, the CM 100 saves data stored in a separation target HDD 20 in another HDD 20, updates various pieces of management information, notifies the maintenance terminal of the management information, and the like.

The CM 100 records the diagnostic result and ends the first diagnosis process (S42). As described above, the RAID apparatus 13 may diagnose the HDD 20 without preparing the diagnosis area separately. In the RAID apparatus 13, since the diagnosis area is not separately prepared, the user area is not restricted. Further, it is possible to solve a problem that the head resides in a fixed point floating state in the diagnosis area which becomes relatively smaller as the storage capacity of the HDD is increased in recent years. The RAID apparatus 13 does not perform the diagnosis process independently from the host I/O and thus, reduction of the I/O performance caused by the diagnosis process may be suppressed.

Next, the second diagnosis process according to the second embodiment will be described with reference to FIG. 10. FIG. 10 is a flowchart illustrating the second diagnosis process according to the second embodiment. The second diagnosis process is a diagnosis process for the HDD 20 performed when a write request is not received. The second diagnosis process is a process executed by the CM 100 at S24 in the diagnosis trigger determination process.

The CM 100 rotationally selects a single HDD 20 from among the HDDs 20 constituting the RAID group as the diagnosing target (S51). The CM 100 determines an area serving as a diagnosing target (access destination) according to a predetermined diagnosis schedule, for example, a sequential selection of respective areas. The CM 100 refers to the access destination check list 510 to determine the area serving as the diagnosing target. The CM 100 refers to the access destination area list 500 to identify a specific area after determining the area which is the access destination area.

The CM 100 updates the access destination check list 510 after determining the access destination area. For example, when the CM 100 refers to the access destination check list 510 to determine the area having an area No of "28" of an HDD No of "1" as the access destination, the area No of "28" of the HDD No of "1" is incremented by one to be set to the area No of "29" of the HDD No of "1".

The CM 100 may determine an area which is the access destination for each of the heads provided in the HDD 20 selected as the diagnosing target. The CM 100 determines whether the access destination is listed in the access destination area list 500 (S52). When it is determined that the access destination is listed in the access destination area list 500, the CM 100 executes the processing of S54 and after. When it is determined that the access destination is not listed in the access destination area list 500, the CM 100 executes the processing of S53. That is, the RAID apparatus 13 performs the write-and-verify for the access destination listed in the access destination area list 500 and a read patrol for the access destination which is not listed in the access destination area list 500.

The CM 100 performs a medium diagnosis by the read patrol (S53). For example, the CM 100 reads data in a block unit from the access destination and performs the medium diagnosis by verifying the data using a check code included in the data.

The CM 100 may limit the access destination to the user area to read user data as the data read from the access destination. Accordingly, the CM 100 does not need to separately prepare the data for diagnosis.

The CM 100 sets, in the storage area of the cache memory, a cache write area for storing the data for diagnosis (S54). The CM 100 saves the data (medium data) read from the access destination in the cache write area (S55).

The CM 100 executes the write-and-verify to the HDD 20 in the area which is the access destination using the medium data stored in the cache write area (S56). Accordingly, the CM 100 may rewrite the medium data in the area which is the access destination. As described above, the write-and-verify executed to the HDD 20 may diagnose the HDD 20 selected as the diagnosing target without destroying the user data and preparing the diagnosis area separately. The write-and-verify functions as a write patrol, that is, the diagnosis of head.

The CM 100 determines whether a result of the diagnosis by the write-and-verify is normal (S57). When it is determined that the result of the diagnosis by the write-and-verify is normal, the process to be performed by the CM 100 proceeds to S58. When it is determined that the result of the diagnosis by the write-and-verify is not normal, the process to be performed by the CM 100 proceeds to S59.

The CM 100 clears the medium data stored in the cache write area (S58). The CM 100 determines whether the diagnostic result which is not normal is a comparison error (S59). When it is determined that the diagnostic result is a comparison error, the process to be performed by the CM 100 proceeds to S60. When it is determined that the diagnostic result is not a comparison error, the process to be performed by the CM 100 proceeds to S63. The comparison error is an error that inconsistency between written data and read data in the write-and-verify is detected when comparing the written data with the read data.

The CM 100 performs a data recovery (S60). For example, the CM 100 performs a retry using the medium data stored in the cache write area or a reconstruction of data using the data of the RAID group and the parity data.

The CM 100 determines whether the data recovery is normally ended (S61). When it is determined that the data recovery is normally ended, the process to be performed by the CM 100 proceeds to S58. When it is determined that the data recovery is not normally ended, the process to be performed by the CM 100 proceeds to S62.

The CM 100 performs separation of the diagnosing target HDD (S62). For example, the CM 100 saves data stored in a separation target HDD 20 in another HDD 20, updates various pieces of management information, notifies the maintenance terminal of the management information, and the like.

The CM 100 records the diagnostic result and ends the first diagnosis process (S63). As described above, the RAID apparatus 13 may diagnose the HDD 20 without preparing the diagnosis area separately. In the RAID apparatus 13, since the diagnosis area is not separately prepared, the user area is not also restricted. Further, it is possible to solve a problem that the head resides in a fixed point floating state in the diagnosis area which becomes relatively smaller as the storage capacity of the HDD is increased in recent years. Further, the RAID apparatus 13 performs the second diagnosis process when the host I/O is absent and thus, reduction of the I/O performance caused by the diagnosis process may be suppressed.

The processing functions described above may be implemented by a computer. In this case, a program in which processing contents of the functions to be equipped in the control apparatus 1 and the RAID apparatus 13 are described is provided. The computer executes the program to implement the processing functions in the computer. The program having described therein the processing functions may be recorded in a computer-readable recording medium. The computer-readable recording medium may include, for example, a magnetic storage apparatus, an optical disk, an opto-magnetic recording medium, and a semiconductor memory. The magnetic storage apparatus may include, for example, an HDD, a flexible disk (FD), and a magnetic tape. The optical disk may include, for example, a DVD, a DVD-RAM, and a CD-ROM/RW. The opto-magnetic recording medium may include, for example, a magneto-optical disk (MO).

The program may be distributed in a portable recording medium such as, for example, a DVD or a CD-ROM in which the program is recorded. The program may be stored in a storage apparatus of a server computer and transferred from the server computer to another computer via network.

A computer which executes the program stores, for example, the program recorded in the portable recording medium or the program transferred from the server computer, in the storage device of its own. The computer reads the program from the storage device of its own and performs the processing according to the program. The computer may read the program directly from the portable recording medium and perform the processing according to the program. The computer may perform the processing according to the program received sequentially each time when the program is transferred from the server computer connected via network.

At least some of processing function described above may be realized by an electronic circuit such as a DSP, an ASIC or a PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A control apparatus, comprising:
a storage unit configured to store diagnosis information regarding storage apparatuses to be diagnosed; and
a processor configured to:
receive a write request from an information processing apparatus, the write request requesting to write first data into a first logical area corresponding to a first physical area of a first storage apparatus from among the storage apparatuses,
in response to the write request, determine, on basis of the diagnosis information, whether the first storage apparatus corresponding to the write request is a target storage apparatus to be diagnosed, and
cause, in response to a determination that the first storage apparatus is the target storage apparatus, the target storage apparatus to execute a write-and-verify process corresponding to the write request including: writing the first data into the first physical area, and confirming whether the first data is normally read from the first physical area.

2. The control apparatus according to claim 1, wherein the processor is configured to cause the target storage apparatus to execute the write-and-verify process after saving the first data in a cache area.

3. The control apparatus according to claim 1, wherein the processor is configured to:
read, when a write request for writing data to the target storage apparatus is not received from the information processing apparatus for a determined time, second data from a user area of the target storage apparatus, and
cause the target storage apparatus to execute a process including:
writing the second data into the user area, and
confirming whether the second data is normally read from the user area.

4. The control apparatus according to claim 3, wherein
the diagnosis information includes an area identifying information capable of identifying the user area, and
the processor is configured to determine the user area on basis of the area identifying information.

5. The control apparatus according to claim 1, wherein the processor is configured to:
cause, when confirmed the first data is not normally read from the first physical area of the target storage apparatus, a second storage apparatus different from the target storage apparatus to execute a process including:
  writing the first data into a second physical area corresponding to the first logical area, and
  confirming whether the first data is normally read from the second physical area.

6. A non-transitory computer-readable recording medium having stored therein a program for causing a computer to execute a process, the process comprising:
  receiving a write request from an information processing apparatus, the write request requesting to write first data into a first logical area corresponding to a first physical area of a first storage apparatus from among storage apparatuses;
  in response to the write request, determining, on basis of diagnosis information regarding the storage apparatuses to be diagnosed, whether the first storage apparatus corresponding to the write request is a target storage apparatus to be diagnosed; and
  causing, in response to a determination that the first storage apparatus is the target storage apparatus, the target storage apparatus to execute a write-and-verify process corresponding to the write request including:
    writing the first data into the first physical area, and
    confirming whether the first data is normally read from the first physical area.

7. A method of controlling, by a control apparatus, diagnosis of storage apparatuses, the method comprising:
  by the control apparatus:
    receiving a write request from an information processing apparatus, the write request requesting to write first data into a first logical area corresponding to a first physical area of a first storage apparatus from among the storage apparatuses;
    in response to the write request, determining, on basis of diagnosis information regarding the storage apparatuses, whether the first storage apparatus corresponding to the write request is a target storage apparatus to be diagnosed; and
    causing, in response to the determining that the first storage apparatus is the target storage apparatus, the target storage apparatus to execute a write-and-verify process corresponding to the write request including:
      writing the first data into the first physical area, and
      confirming whether the first data is normally read from the first physical area.

* * * * *